April 17, 1934.  G. FAILLA ET AL  1,954,868
METHOD AND MEANS FOR TREATMENT BY RADIATIONS
Filed Dec. 18, 1929  2 Sheets-Sheet 1

G. FAILLA
J. E. ROSE
INVENTORS

BY Darby & Darby
ATTORNEYS

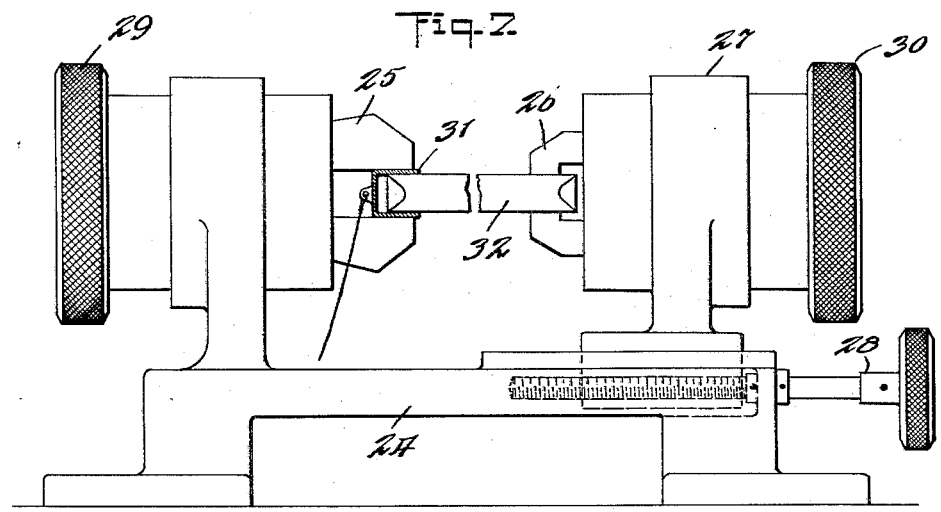
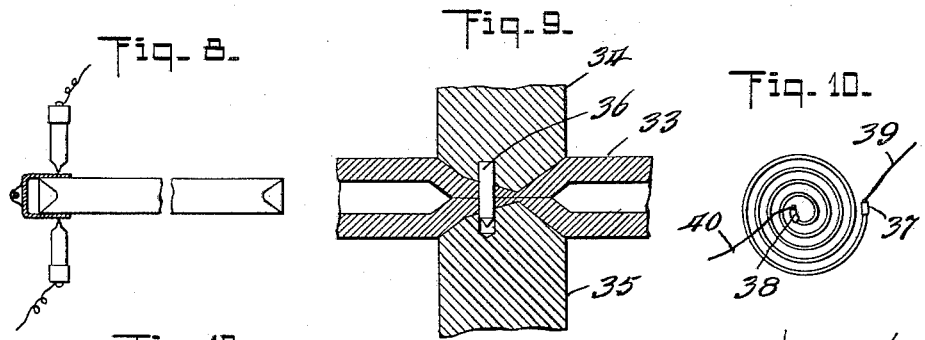
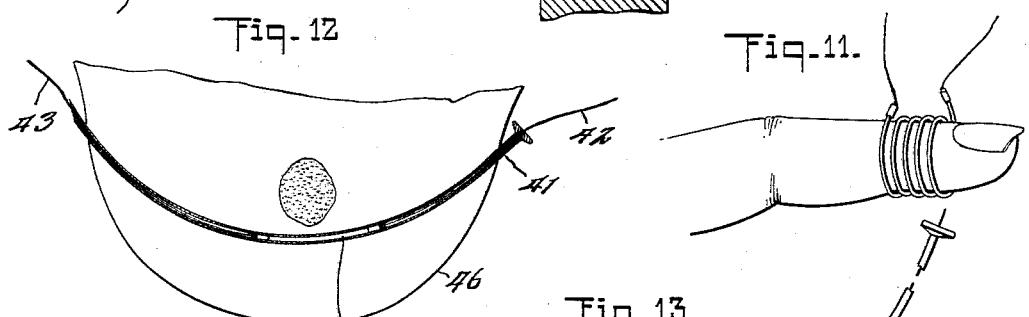
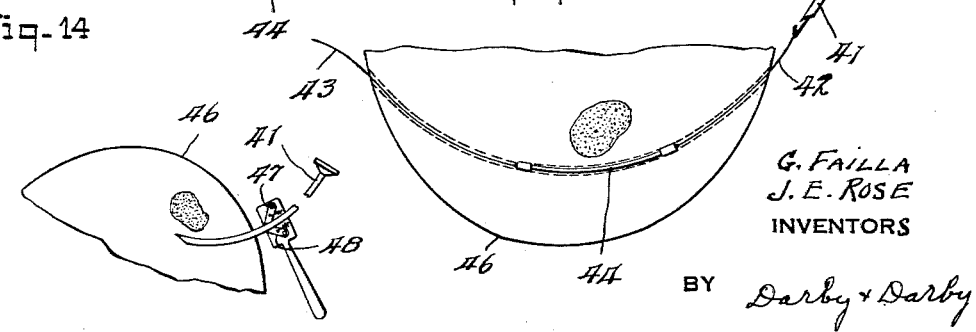

Patented Apr. 17, 1934

1,954,868

UNITED STATES PATENT OFFICE 1,954,868

METHOD AND MEANS FOR TREATMENT BY RADIATIONS

Gioacchino Failla and John Ernest Rose, New York, N. Y.

Application December 18, 1929, Serial No. 414,873

4 Claims. (Cl. 174—177)

This invention relates to methods and means for treating body tissues and with particularity to methods and means for treating by a radioactive source, such as radium emanation.

One of the principal objects of the invention is to provide a method of internally radiating a mass by means of radio active material by embedding the material in the mass and moving the embedded material from point to point within the mass as desired.

The practice heretofore employed in treating deep seated tumors by radio-active substances has been to enclose the material, such as radon in a sealed enclosure which is known as a radon seed. The seed is then inserted by means of a special needle or trocar into the tissue adjacent to or within the tumor or growth. Obviously the exact location of the seed in the case of deep seated growths is rendered difficult both because of the smallness of the seed and the fact that once the seed is inserted it is impractical to change its location. Each seed must be separately inserted, requiring a separate puncture of the body tissue for each insertion. Furthermore, since in most cases it is desirable to locate the seeds in a well defined array or formation, as for example in a curved line, the difficulties of securing an accurate arrangement are well nigh insurmountable.

Accordingly it is one of the principal objects of the present invention to provide novel methods of treating tumors or other diseased tissue by radio-active materials. It is proposed to achieve this object by employing so-called radon seeds having a filamentary member or thread attached to both ends thereof whereby the seed may be moved in any desired direction even after withdrawal of the trocar or seed inserter. Thus the seed may be gradually shifted back and forth from time to time as the requirements and conditions of the treatment may dictate.

The invention also provides a method of treating relatively large tumors or growths by employing a long capillary-like seed which is flexible and may be implanted in the tissue by a single insertion of the trocar or inserter. As a result of the long filamentary character of the seed it can be inserted by means of a curved needle which is shaped to conform to the area to be treated.

Another object is to provide a method of treating tumors or other body tissue whereby ancillary dangerous effects on the patient are avoided. In achieving this latter object it is proposed to employ a single-walled enclosure which is of a minimum thickness and outside diameter but possesses the requisite filtering action on the harmful rays or radiations from the radium emanation.

The introduction of radium emanation or other radio active source into a tumor mass is apt to facilitate the dislodging of cancer cells and even accelerate the formation of metastases.

In accordance with the present invention the chances of producing metastases are reduced to a minimum since the radon implant or seed is enclosed in a single, long, thin, and flexible capillary-like member. In the case of tumors which require a small center of radiation however the invention contemplates employing a seed which is of smaller outside dimensions than any seed that has heretofore been found practicable of manufacture. In other words, in radon seeds as heretofore employed the radon has first been sealed in a thin-walled member, such as glass or the like, which is provided with an outer covering of a suitable metal or metals for filtering out the harmful rays or radiations. Since the sealed container proper must be assembled within the shielding covering it is necessary to provide a certain clearance to effect this assembly. This in itself tends to increase the overall size or outside diameter of the seed.

Furthermore, in the case of glass containers for the radon it may be necessary to employ more than one shielding cover for filtering out the alpha and primary beta particles which are objectionable in therapeutic use. In accordance with the present invention it is proposed to employ a single-walled container for the radon which has the minimum outside diameter and is provided with a wall thickness capable of filtering out the harmful rays from the radium emanation without affecting the useful or gamma rays.

As mentioned hereinabove the separation of the useful gamma rays from the alpha and beta rays has been accomplished heretofore by successive filtrations. However, there has been found, and the present invention has for one of its principal objects, a radon seed wherein the enclosure for the radon is in the form of a single-walled member, such as gold or platinum, having thickness whereby alpha and beta rays are prevented from reaching the tissue and at the same time the gamma rays are not materially lessened. It has been further found that practically the ideal type of seed is one in which the radon is enclosed in a platinum or gold capillary tube with a wall thickness of 0.5 mm. or less and with the smallest possible bore. In practice, tubes having bores between 0.1 mm. and 0.15 mm. have been employed and have been found to produce the necessary therapeutic action without producing any harmful effects either in the form of necrosis or in the production of metastases.

As a result of the relatively short active life of radon it is possible, and the present invention contemplates as another of its objects, to use implants of the above described dimensions which can be left in the tissue or tumor permanently.

In addition to providing novel methods of treatment which have beneficial advantages not attainable by prior art seeds the present invention contemplates as one of its objects a process of manufacturing seeds whereby the overall dimensions of the seed are reduced to a minimum consistent with required filtering action and mechanical strength.

A feature of the invention relates to a radon seed wherein the radon is enclosed in a single-walled capillary-like housing, preferably of gold or platinum or other similar metal, and having sufficient thickness to filter out the harmful alpha and beta rays.

Another feature of the invention relates to a radon seed in the form of a single-walled capillary-like housing for the radon and provided with a cap which may be welded or otherwise mechanically secured to one or both ends of the seed, the caps preferably being provided with means for attaching a removing filament or thread thereto.

Another feature of the invention relates to a radon seed having the ends thereof capped without increasing the external diameter of the seed.

Another feature of the invention relates to a capped radon seed which is provided with barbed portions to prevent dislodgment of the seed when the latter is left in the tissue to be treated.

A further feature relates to a machine for capping radon seeds.

A still further feature relates to a single-walled radon seed having a flattened perforated end to receive a removing thread or filament.

Another feature pertains to the mechanism for simultaneously flattening and perforating the end of a single-walled radon seed.

A further feature of the invention relates to a device for containing radioactive materials, said device being in the form of a flexible filamentary member.

A further feature relates to a radon treating device which is in the form of a spiral-shaped member containing radioactive material.

A further feature relates to a radon treating device which is in the form of a helical shaped member containing radioactive material.

Other features and advantages of the invention not specifically enumerated will be apparent after a consideration of the following description and appended claims.

Referring to the drawings—

Fig. 7 illustrates a simple type of machine for assembling and fastening the caps to the seed;

Fig. 8 illustrates schematically another manner of attaching the caps to the seeds;

Fig. 9 shows mechanism for simultaneously dividing a length of capillary tubing into small seeds, at the same time that the end of each seed is flattened and perforated to receive a removing thread;

Fig. 10 illustrates an implant for radio-active treating source in the form of a spiral, preferably having removing threads attached thereto;

Fig. 11 illustrates a helical form of the device shown in Fig. 10;

Figs. 12 and 13 show two different methods of inserting a long capillary-like seed into the tissue to be treated;

Fig. 14 illustrates schematically the novel method of inserting a hollow or solid curved needle according to the invention.

Figure 1:
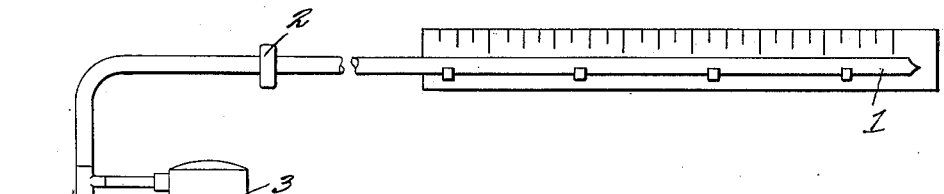
Figure 1 shows in schematic form the manner of filling and measuring the size of the radon seeds according to the invention.

Referring more particularly to Fig. 1, the numeral 1 represents a length of capillary-like tubing, preferably of gold, platinum or other similar material. The tube 1 is connected and sealed as indicated by the numeral 2 to a source of radio-active material, such as radon, indicated by the numeral 3. By means of a suitable pump 4 the radon of source 3 may be forced under the proper pressure into the tube 1. When the proper volume of radon has been forced into the tube the same may be sealed off at the point 2, or it may be cut into small units in the manner disclosed in the copending application of Failla and Rose, Serial No. 341,211, filed February 19, 1929. As described in said application the tube 1 is preferably cut into smaller lengths by means of a blunt-jawed cutting tool which flattens the ends of the tube to the shape shown in Fig. 2. At the same time this flattening of the ends serves as a complete seal for the radon content within the tube.

Figure 2:
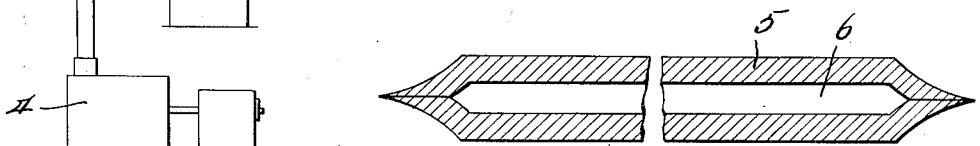
Fig. 2 shows in magnified form a radon seed according to the invention.

It has been found that there is a maximum diameter for the tube which can be used without producing irritation and other harmful effects on the body tissue. Such a seed is illustrated in Fig. 2 wherein the numeral 5 represents the wall of the seed, preferably not greater than 0.5 mm. and with a bore 6 between 0.1 mm. and 0.15 mm. As a result of the great difference in penetrating power of beta and gamma rays the metal thickness 5 is sufficient to filter out rays but without materially lessening the useful gamma rays.

It has been further found that seeds having an external diameter which is materially greater than 1 mm. produce harmful irritations on the surrounding body tissues, particularly when the seeds are left permanently in the body. Seeds, such as disclosed in Fig. 2 having an outside diameter of 1.1 mm., have been manufactured and used without producing such harmful irritations and can therefore be permanently left within the body tissues even after the active life of the radon has ceased.

The seed of Fig. 2 is adapted to be implanted within the tissue to be treated by means of a trocar or needle of any well known form.

Under certain circumstances, however, it is often desirable to be able to change the position or location of the seed within the tissue from time to time. To effect this proper change of position the seed is preferably provided at opposite ends with filamentary or thread-like members which project outwardly from the exterior of the body wherein the seed is implanted and by means of which the seed may be moved from point to point as the condition and results of the treatment requires. One preferred manner of attaching these removing threads to the seed is illustrated in Fig. 3 wherein the seed 7 is provided at both ends with caps 8 and 9 which may be of gold, platinum, aluminum, or other similar metal, and preferably of the order of 0.1 mm. thickness.

These caps may be fastened to the ends of the seed by spot- or arc-welding, by crimping, pinching, soldering, cementing, spinning, threading, or in any other convenient manner. The caps are preferably provided with eyelets to receive the knotted ends of the removing threads 10 and 11. One manner of providing these eyelets is shown in the right-hand cap of Fig. 3 wherein the cap is provided with a perforation in the end thereof while the left-hand cap of Fig. 3 is provided with an integral lug 12 which is perforated to receive the removing thread.

Figure 3:
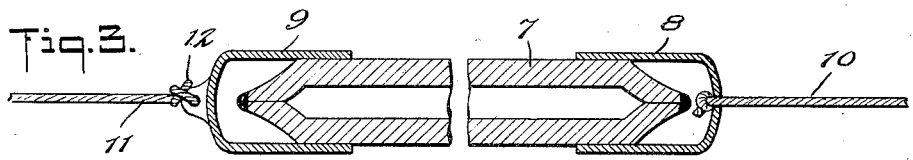
Fig. 3 shows the seed of Fig. 2 with the ends thereof welded or otherwise integrally sealed and rounded, together with caps for each end of the seed and threadlike adjusting members for the seed.

It will be understood, of course, that the seed of Fig. 3 preferably has the same dimensions as the seed of Fig. 2, and in any event the outside diameter should not be materially greater than 1 mm.

Figure 4:
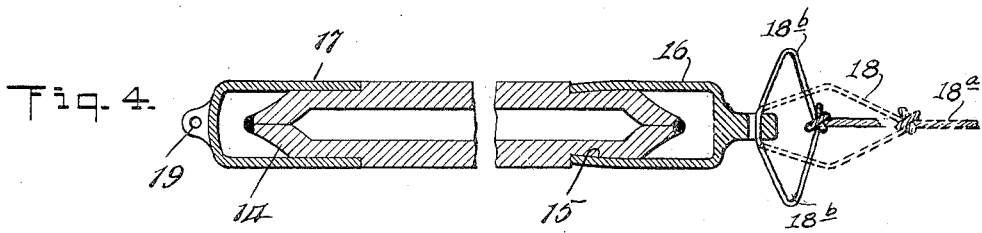
Fig. 4 shows a modified form of the seed disclosed in Fig. 3 wherein the caps are attached to the seed without increasing the overall diameter thereof. This figure also shows means for preventing accidental dislodgment of the seed after it is left in the body.

Referring to Fig. 4, there is shown a modified form of seed wherein the caps are affixed to the seed ends without increasing the overall diameter of the seed proper. The ends 13 and 14 of the seed are sealed, flattened and preferably welded in the manner described in application Serial No. 341,211, and the seed wall and bore are preferably of the same dimensions as given in connection with the seeds of Figs. 2 and 3. By means of any suitable tool the ends of the seed are cut or shouldered as indicated by the numeral 15 to receive the caps 16 and 17. Preferably the shoulders are formed with an inclination as indicated in connection with the end 15 of the seed to receive the correspondingly inclined end of the cap 16. The depth of the shoulder is preferably such that when the cap is in position it is of substantially the same outside diameter as the body of the seed. When thus assembled the cap may be permanently affixed by means of welding, crimping, threading or any other convenient manner. As a result of the inclined relation between the end of the cap 16 and the end 15 of the seed there is less chance of the cap becoming loose or displaced during use. It will be understood, of course, that this latter feature is not absolutely necessary. Thus as shown in the left hand end of Fig. 4 the cap and shoulder are of uniform diameter. In order to prevent the seed from being accidentally dislodged from its proper location within the body a thin flexible wire 18 formed to the shape shown, is welded or otherwise fastened to the cap 16 and a removing filament 18a is attached to the wire 18. When the seed is being implanted tension is exerted on thread 18a, causing the wire 18 to assume the shape shown in dotted lines. After the seed is properly implanted tension is removed from thread 18a allowing wire 18 to assume its normal shape wherein the portions 18b extend outwardly a considerable distance beyond the seed body and provide an anchorage in the surrounding tissues. If the seed is to be removed, tension on thread 18a reduces the effective width of member 18 and allows the seed to be withdrawn freely.

Figure 5:
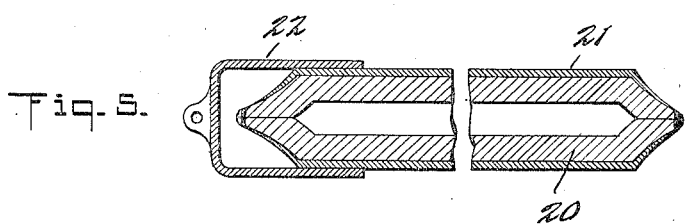
Fig. 5 shows another type of seed similar to the seed of Fig. 3 but with an additional coating applied to the seed proper.

Fig. 5 shows another type of seed wherein the main radon or other metal is provided with a coating or covering 21 of a metal such as aluminum for filtering out the secondary beta radiations. A cap 22 with a removing filament may be attached to either or both ends of the seed as hereinabove described.

Figure 6:
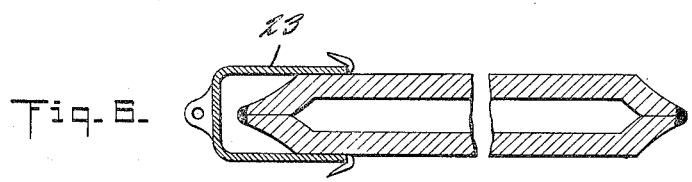
Fig. 6 illustrates how one of the caps may be barbed to prevent accidental dislodgment of the seed while in the body.

Fig. 6 shows how the end of the cap 23 may be struck up or otherwise barbed to prevent accidental dislodgment of the seed when the latter is in the tissue to be treated.

As a result of the type of seed and the manner of attaching the removing filaments thereto the process of assembling the seed with the removing filaments is materially expedited and the handling necessary during this assembly is likewise materially lessened, thus decreasing the harmful effects on the person assembling the seed. For example, seeds of different strengths, but without the caps and removing filaments attached thereto, may be kept in stock, and all that is necessary is to mount the seed proper in a suitable holding device and then place a cap together with the removing filament attached thereto over each end of the seed and either welding, threading or mechanically crimping the caps in position. Thus there is shown in Fig. 7 a simple form of machine for effecting this assembly. In this figure the numeral 24 represents a suitable base or standard carrying a pair of adjustable chucks 25 and 26. The chuck frame 27 is slidably mounted in the base 24 and is provided with a micrometer adjusting arrangement 28. Similarly each of the chucks 25 and 26 is provided with adjusting means 29 and 30 respectively.

When it is desired to cap a seed such as the seed of Fig. 2 a suitable cap 31 is positioned in the chuck jaws 25 and the member 29 turned to hold the cap in position. Seed 32 is positioned in the chuck jaws 26 and the member 30 turned firmly to grip the seed and to align it with the cap 31, it being understood that the frame 27 is in its right-hand position. The member 28 is then adjusted to advance the frame 27 until the left-hand end of the seed 32 enters the cap 31. When the proper relation between the seed and cap has been thus effected the member 29 is adjusted to close the jaws 25 further and to effect a tight mechanical joint between the seed and the cap. Since the seed is preferably of gold, platinum or other similar material this mechanical union is readily effected, and results in a formation such as shown in Fig. 4. If desired, the chuck jaws 25 may be designed to give the slanting effect to the shoulder end of the seed and the cap as illustrated in connection with the right-hand end of Fig. 4. Likewise the chuck jaws 25 may be provided with roughened or other type of face to effect a crimping between the cap and the seed end. If the opposite end of the seed is to be capped then the jaws 26 are open and frame 27 retracted and a similar cap inserted between the jaws 26 whereupon the above process is repeated in capping the right-hand end of the seed.

If desired, the ends of the seed prior to assembly may be threaded in any suitable manner and internally threaded caps may be provided and assembled over the ends of the seed in any convenient manner.

Fig. 8 illustrates schematically a seed having the cap spot-welded thereto.

Fig. 9 illustrates a portion of a machine for simultaneously sealing, flattening and perforating the ends of a seed. The numeral 33 indicates a length of capillary tubing preferably having a wall thickness of 0.5 mm. and a bore of the order of 0.15 mm. This capillary tubing may be of gold, platinum or other similar material and is filled with radon or other radio active material in the manner described in application Serial No. 344,211. The numerals 34 and 35 represent a pair of movable severing jaws having blunt edges of the shape shown. Jaw 34 is provided with a small sharp pointed pin 36.

Normally the jaws 34 and 35 are separated a sufficient distance to enable the tubing 33 to be fed therethrough. At the proper points the jaws are brought together and due to the slanting edges thereof the tube 33 is severed and at the same time the member 36 perforates the flattened ends of the severed tubings to provide a perforation for receiving a suitable removing filament or string.

Thus in one operation the seed is sealed, severed and provided with a perforation to receive the removing filament.

While a single perforating member 36 is shown in Fig. 9, it will be understood that a pair of such members may be provided, thus simultaneously perforating the adjacent ends of severed seeds.

Similarly, while one pair of jaws 34 and 35 are shown in the drawings, it will be understood that a plurality of such jaws may be employed. Thus a complete length of tubing 33 may be simultaneously subdivided into seeds with the ends thereof flattened, sealed and perforated.

In certain instances it may be desirable to treat diseased portions of the body externally by radio-active means. When the surface to be treated is extensive in area it is impractical and otherwise disadvantageous to cover the surface with a plurality of small seeds in which case a source of the shape shown in Fig. 10 may be employed. When the source is made from the capillary tubing of the dimensions given in connection with Fig. 2, it may be formed in any desired lengths, for example from 3 to 250 mm., and because of the flexible and filamentary character of the source it may be readily formed into any desired configuration. Thus as illustrated in Fig. 10 the filamentary source is formed into a plane figure of spiral shape. While such a source is useful in external treatments, it will be understood that it is also capable of use in treating flat or conical lesions, and may be inserted in any suitable manner within the lesion, in which case the ends of the source are preferably provided with caps 37, 38 and removing strings 39 and 40. A source of the type disclosed in Fig. 10 provides a concentrated radio-active source which is distributed over a large area and avoids the use of innumerable small seeds or distinct sources.

Instead of forming flexible filamentary sources in a plane spiral shape as indicated in Fig. 10, they may be formed in a helical shape as indicated in Fig. 11, and positioned over a portion of the body to be treated. By means of the threads attached to the ends of the source it may be handled without actual contact therewith.

Instead of forming the source in the shapes shown in Figs. 10 and 11, as shown in Fig. 12 the filamentary seed 44 of the requisite length may be placed in a curved trocar or needle 41 with the removing filaments 42 and 43 emerging from the trocar as indicated. As indicated in Fig. 13 the trocar may then be removed while the seed is held in position by means of the threads 42 and 43 without disturbing the position and location of the seed 44. Thus there is provided a method of implanting the seed whereby it may be accurately located within the tumor or growth to be treated. Furthermore even after the withdrawal of the trocar 41 the position of the seed 44 may be varied from time to time as requirements of the treatment dictate, by means of the threads 42 and 43, thus enabling the seed to be shifted back and forth at will.

Inasmuch as the needle 41 may be very long and need not be materially larger in diameter than the seed, the needle must be inserted in a different manner from ordinary straight needles. One preferred manner of effecting the proper insertion of the curved needle is illustrated in Fig. 14 wherein the numeral 45 represents a device for gripping the needle 41 very close to the body surface 46. Member 45 is provided with two gripper jaws 47, 48 which firmly grip the needle when the member 45 is moved toward the left, but which release their grip when the member 45 is moved toward the right, thus providing a substantially one-way feed for the needle. Depending upon the nature of the tissue wherein the needle is inserted and the needle curvature, it may be necessary to feed the needle forward in a step-by-step manner a very small distance at a time. This method of insertion is necessary with the long curved needles disclosed, since otherwise pressure on the needle end would cause it to buckle and follow an uncertain path through the flesh.

Since in the embodiments illustrated in Figs. 12, 13 and 14 the function of the needle 4 is merely to make a track for the seed, it will be clear that the seed may be inserted in any convenient manner. Thus the needle without a seed therein may be inserted to the position shown in Fig. 13 and a fine wire passed through the needle from one end to the other where it may emerge from the exterior of the flesh. The removing filament 42 or 43 may then be attached to this wire and the needle withdrawn. The seed may then be drawn into the tissue by means of the wire.

If desired the implant and trocar may be simultaneously moved through the flesh. When the implant has reached the proper point at which it is to be left the trocar alone is pulled out, the thread or wire slipping through the bore. Likewise instead of using a hollow needle, the needle may be solid and provided with an edge a short distance away from the sharp point. When this solid needle is inserted and the sharp end emerges from the flesh, the implant thread may be fastened to the needle edge. The trocar may then be withdrawn until the wire and implant thread appear and the implant may be further manipulated by the threads attached to its ends. It will be understood that wherever the term "seed" is employed in this specification that this is merely used for convenience of description and is intended to cover any radio-active source whether the same is to be implanted within the body or used externally.

While specific arrangements and shapes of seeds are illustrated in the drawings, it will be understood that the invention is not limited thereto and that various changes and modifications may be made without departing from the spirit and scope of the invention. Thus while the caps 8, 9, 16, 17, etc. are shown as completely surrounding the ends of the seeds it will be understood that skeleton or cage-like caps may be employed. Thus a U-shaped cap may even be found convenient, and the term cap as employed in the claims is intended to cover any type of member integrally attached to the seed-end for receiving a removing filament or thread.

What is claimed is:

1. In combination a radon seed and a filamentary member attached to each end of the seed for moving the seed in a plurality of directions after implantation in a body to be treated.

2. In combination a radon seed in the form of a single-walled capillary tube containing a supply of radon, the ends of said tube being mechanically and hermetically sealed and a hollow cap permanently affixed to an end of the seed.

3. A radon seed comprising a hollow tube containing a quantity of radon, the ends of said tube being sealed and the outer periphery of said ends being shouldered, and a thin-walled metal cap affixed over the shoulder portion.

4. A radon seed adapted to be implanted in a body portion to be treated, and means on said seed for preventing accidental dislodgment of said seed while implanted.

GIOACCHINO FAILLA.
JOHN ERNEST ROSE.